United States Patent [19]
Dawson

[11] Patent Number: 5,553,160
[45] Date of Patent: Sep. 3, 1996

[54] METHOD AND APPARATUS FOR DYNAMICALLY SELECTING AN IMAGE COMPRESSION PROCESS BASED ON IMAGE SIZE AND COLOR RESOLUTION

[75] Inventor: Bryan J. Dawson, Aloha, Oreg.

[73] Assignee: Intel Corporation, Santa Clara, Calif.

[21] Appl. No.: 299,893

[22] Filed: Sep. 1, 1994

[51] Int. Cl.$^6$ ........................................... G06K 9/00
[52] U.S. Cl. ........................ 382/166; 382/239; 358/430
[58] Field of Search ................................. 382/166, 232, 382/239, 244, 286; 358/261.2, 430, 449, 539; 348/404; H04N 1/41, 11/02

[56] References Cited

U.S. PATENT DOCUMENTS

| | | | |
|---|---|---|---|
| 4,965,754 | 10/1990 | Stansfield et al. | 364/526 |
| 5,086,488 | 2/1992 | Kato et al. | 382/56 |
| 5,249,053 | 9/1993 | Jain | 358/209 |
| 5,353,132 | 10/1994 | Katsuma | 358/539 |
| 5,361,144 | 11/1994 | Sugiura | 358/500 |
| 5,363,219 | 11/1994 | Yoshida | 358/539 |

FOREIGN PATENT DOCUMENTS 2249238  4/1992  United Kingdom ............. H04N 1/41

Primary Examiner—Leo Boudreau
Assistant Examiner—Andrew W. Johns
Attorney, Agent, or Firm—Blakely, Sokoloff, Taylor & Zafman

[57] ABSTRACT

A method and apparatus which dynamically selects an image compression process for an image to be transferred from a first agent to a second agent. The image being compressed has a particular size associated with it, which indicates the amount of storage space required to store the image, such as in the system memory or a mass storage device. The image also has a particular color resolution associated with it, which indicates the number of different colors which the image may contain. A particular image compression process is selected for the image based on its size and color resolution. In one embodiment, the present invention produces one of three possible outcomes. First, the image may remain uncompressed. Second, the image may be compressed using a lossless compression process, which reduces the size of the image while retaining all data for the image. Third, the image may be compressed using a lossy compression process, which reduces the size of the image by losing a small amount of data for the image.

25 Claims, 6 Drawing Sheets

5,553,160

METHOD AND APPARATUS FOR DYNAMICALLY SELECTING AN IMAGE COMPRESSION PROCESS BASED ON IMAGE SIZE AND COLOR RESOLUTION

BACKGROUND Of THE INVENTION

1. Field of the Invention

The present invention pertains to the fields of computer systems, personal conferencing, and image processing. More particularly, this invention relates to the compression of image data for transfer between two agents.

2. Background

Computer technology is continuously advancing, providing newer computer systems with continuously improved performance. This improved performance is evidenced in a wide variety of characteristics. For example, the processing speeds of computer systems are increasing, the storage capabilities are increasing, and the visual display capabilities are increasing. One result of this improved performance is an increased use of computer systems by individuals in a wide variety of business, academic and personal applications.

One problem experienced in the advancement of computer technology is that the various characteristics which define a system's performance do not always advance at the same rate. For example, storage capabilities are not always being improved at the same rate as processing speed. Thus, although a computer system may utilize a high-performance processor, the storage device of the system (such as a hard disk) may be neither fast enough nor large enough to fully support the processor.

In addition, the increase in use of computer systems by individuals has found new and expanded areas of usage. One such area is that of personal conferencing, which is becoming increasingly demanded by computer users. Personal conferencing generally refers to two or more individual computer systems in communication with each other via a communication device. Such a communication device may be, for example, a telephone line or a local area network (LAN).

Although personal conferencing capabilities are increasingly demanded by computer users, the performance of communication devices do not always allow computer users to take full advantage of their computer systems. For example, the communication device(s) used to connect two computer systems may not be able to transfer data between the systems at the rate each system is able to transmit or receive and process data. Thus, two high-performance computer systems communicating with each other may not be able to operate at their optimal level; rather, they are required to accept the limitations found in the communication device(s) coupling them.

For example, increased processing speeds have supported an increase in visual display capabilities, as evidenced by an increase in both screen and color resolutions. Screen resolution refers to the number of pixels in a visual display. Each pixel is an individual screen location which can be illuminated or otherwise activated on the visual display, and can be represented by a unique (x,y) coordinate. Modern display capabilities include screen resolutions such as 640×480, 800×600, and 1024×768. Color resolution refers to the color depth of each pixel on the display; that is, the number of different colors each pixel can display. Modern computer systems can provide color resolutions in the order of millions of colors.

This increase in display capabilities, however, is accompanied by an increase in memory space required to store an image being displayed, or to be displayed, on the visual display. That is, a color must be stored for each pixel on the screen. For example, a display with 800×600 resolution contains 480,000 pixels, each of which can have any one of the available colors. If the display has a color resolution of 256 colors (which can be represented using 8 bits), then the storage size of an entire-screen image is approximately 500k bytes, which is the amount of memory necessary to store the image. Thus, it will be apparent that as the color resolution increases, the storage area required for an image increases dramatically.

The increase in required storage area generates two significant problems. First, the storage device (such as a disk or tape drive) must be large enough to store a sufficient number of images. The actual number of images is dependent on the users of the system. Second, the communication devices coupling multiple computer systems are relatively slow, compared to the processing capabilities of the computer systems. Thus, the time required to transfer such a large image between computer systems can be very long.

One technique used to solve both of these problems is that of data compression. Utilizing data compression techniques, the storage size of the image is reduced while maintaining the same resolution. Thus, the image utilizes a smaller amount of space in the storage device, and can be transferred via a communication device more quickly.

Two types of compression techniques are commonly used to compress images: lossless compression and lossy compression. In lossless compression, the storage size of the image is reduced without losing any data. That is, the image can be compressed, stored or transferred, then decompressed, and the decompressed image will be identical to the original image. In lossy compression, however, the size of the image is reduced and a small amount of data loss occurs. Thus, an image which is compressed, stored or transferred, and then decompressed will be slightly different from the original image. Although lossy compression causes some data loss, ideally that data loss is not evident to the user.

Both lossless and lossy compression processes typically work best in situations where the other works poorly. That is, when lossless compression works well, lossy compression generally works poorly, and vice versa. Lossless compression typically works well in situations where the data being compressed has significant entropy. Entropy refers to repetitions within the data. For example, an image comprising a total of 50 characters, each of which is different, would have low entropy, whereas an image comprising 10 occurrences each of five different characters would have higher entropy.

Lossy compression, however, typically works well in situations where the data being compressed has low entropy. In situations of low entropy, little of the data being compressed is repeated. An example of a low entropy image is a continuous-tone image with a color resolution of 16 million colors. Typically, in a continuous-tone image very few, if any, pixels have the same color. However, even though two adjacent pixels may have slightly different colors, the difference in color may not be noticeable to the human eye. Thus, in a wide variety of circumstances, the assumption is made that two pixels with slightly different colors can be treated as having the same color. Lossy compression takes advantage of this assumption and alters the colors of some of the pixels. Thus, some data loss occurs during compression, however ideally this data loss is not observable by the system user.

These compression techniques can be utilized both to transfer image data between two computer systems and to store image data in a storage device, thereby reducing transfer time and reducing storage requirements, respectively.

One technique for selecting between these image compression techniques is to always use one or the other. For example, if the system typically transfers images with high entropy, then the system uses lossless compression for all images. Alteratively, if the system typically transfers continuous-tone images, then the system uses lossy compression for all images. However, such a technique does not work well in systems which transfer both types of images because the system is tuned to optimize a particular type of image and provides poor performance for other types of images.

Generally, only one of these two compression techniques (lossless or lossy) works well on a particular image or portion of data. Thus, it would be beneficial to provide a system which optimally chooses between these techniques for each image being transferred or stored.

Another technique for selecting between these image compression techniques is to allow the system user to choose between them. That is, if the system user desires to use data compression, he or she is given a choice between the two compression techniques and must choose which one is used. This technique has several disadvantages. First, the system user may not understand which technique works best in which situations, and thus may not be qualified to make the choice. Second, the image may be such that, even if the user is qualified to choose, it may not be readily apparent which choice is correct. Third, the user is inconvenienced by having to make the choice. This inconvenience is especially true in situations where the user is transferring a large number of images, and is required to make a choice for each of the images being transferred. Fourth, the speed of the system is decreased due to the requisite decision time of the user. One goal of compression is to increase the speed of data transfers; thus, the time required by the user to select a compression technique hinders attaining this goal.

Another technique for selecting an image compression process is an adaptive technique which partitions an image into multiple smaller sections. A first section is compressed using one particular compression algorithm, and if the algorithm worked well, then that same compression algorithm is used for the next section. If the compression algorithm did not work well, then another algorithm is chosen to compress the next section. The first section is not recompressed using a different algorithm. This process proceeds for each section in the image, with the compression algorithm for one section being dependent on the success of the compression of the previous section. This adaptive technique may also be applied to a series of images, where each image of the series is analogous to a section. In this situation, the compression algorithm for an image is dependent on the success of the compression of the previous image in the series.

This adaptive technique has several disadvantages. For example, entropy can often be found in images as a whole, however that entropy may not exist when the image is partitioned into smaller sections. In addition, several attempts may be made to find the proper algorithm, each of which may result in a very poor compression ratio for that section. Since these sections are not recompressed, the compression ratio for the entire image suffers.

Thus, it would be advantageous to provide a system which optimally compresses the image data for storage and/or transfer.

it would furthermore be advantageous to provide a system which automatically and accurately selects the appropriate compression technique for each image.

In addition, it would be advantageous to provide a system which quickly determines the appropriate compression technique for an image transfer.

The present invention provides for these and other advantageous results.

SUMMARY OF THE INVENTION

A method and apparatus for dynamically selecting an image compression process is disclosed herein. The apparatus of the present invention compresses an image for transfer from a first agent to a second agent. The image being compressed has a particular size associated with it, which indicates the amount of storage space required to store the image, such as in the system memory or a mass storage device. The image also has a particular color resolution associated with it, which indicates the number of different colors which the image may contain. The present invention selects a particular image compression process for the image based on its size and color resolution.

In one embodiment, the present invention produces one of three possible outcomes. First, the image may remain uncompressed. Second, the image may be compressed using a lossless compression process, which reduces the size of the image while retaining all data for the image. Third, the image may be compressed using a lossy compression process, which reduces the size of the image by losing a small amount of data for the image.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the descriptions to follow, numerous specific values are given. For example, specific image sizes are given and specific compression ratios are given for comparison purposes. It will be appreciated that these specific values are shown as examples only. These values can be replaced with any of a wide range of values within the spirit and scope of the present invention.

Figure 1A:
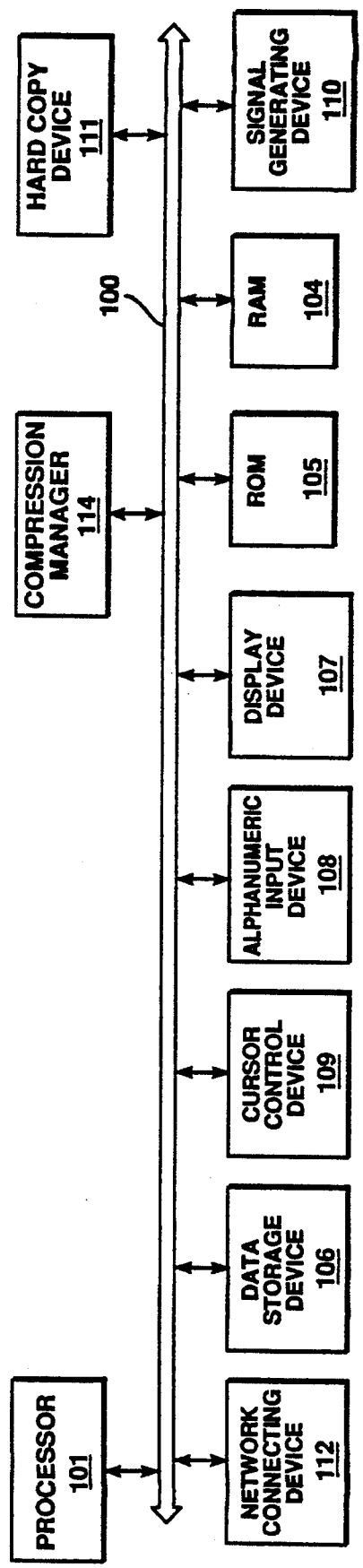
FIG. 1A shows an overview of an example computer system of the present invention.

FIG. 1A shows an overview of an example computer system of the present invention. The computer system generally comprises a bus or other communication device 100 for communicating information, and processor 101 coupled with bus 100 for processing information and instructions. In one implementation, processor 101 is an Intel® architecture microprocessor; however, the present invention may utilize any type of microprocessor architecture. In one embodiment, bus 100 includes address, data and control buses. The system also includes random access memory (RAM) 104 coupled with bus 100 for storing information and instructions for processor 101, a read only memory (ROM) 105 coupled with bus 100 for storing static information and instructions for processor 101, a data storage device 106 such as a magnetic disk and disk drive coupled with bus 100 for storing information and instructions, a display device 107 coupled to bus 100 for displaying information to the computer user, an alphanumeric input device 108 including alphanumeric and function keys coupled to bus 100 for communicating information and command selections to processor 101, a cursor control device 109 coupled to the bus for communicating user input information and command selections to processor 101, and a signal generating device 110 coupled to bus 100 for communicating command selections to processor 101.

A hard copy device 111, such as a plotter or printer, is also coupled to bus 100 for providing a visual representation of the computer images. In one embodiment, a network connecting device 112 is coupled with bus 100 for allowing the system to communicate with other computer systems over a larger network of computer systems, such as a local area network (LAN).

In one embodiment, the method of the present invention is implemented as a software routine run by processor 101. In one implementation, this software routine is included in the personal conferencing application PROSHARE™, produced by Intel® Corporation of Santa Clara, Calif., the corporate assignee of the present invention.

In one embodiment of the present invention, a separate compression manager 114 is also coupled with bus 100. In this embodiment, compression manager 114 includes circuitry for implementing the method of the present invention. In one implementation, compression manager 114 comprises a random access memory or a read only memory, analogous to RAM 104 and ROM 105 discussed above, and the method of the present invention is contained in compression manager 114 as a computer program.

Figure 1B:
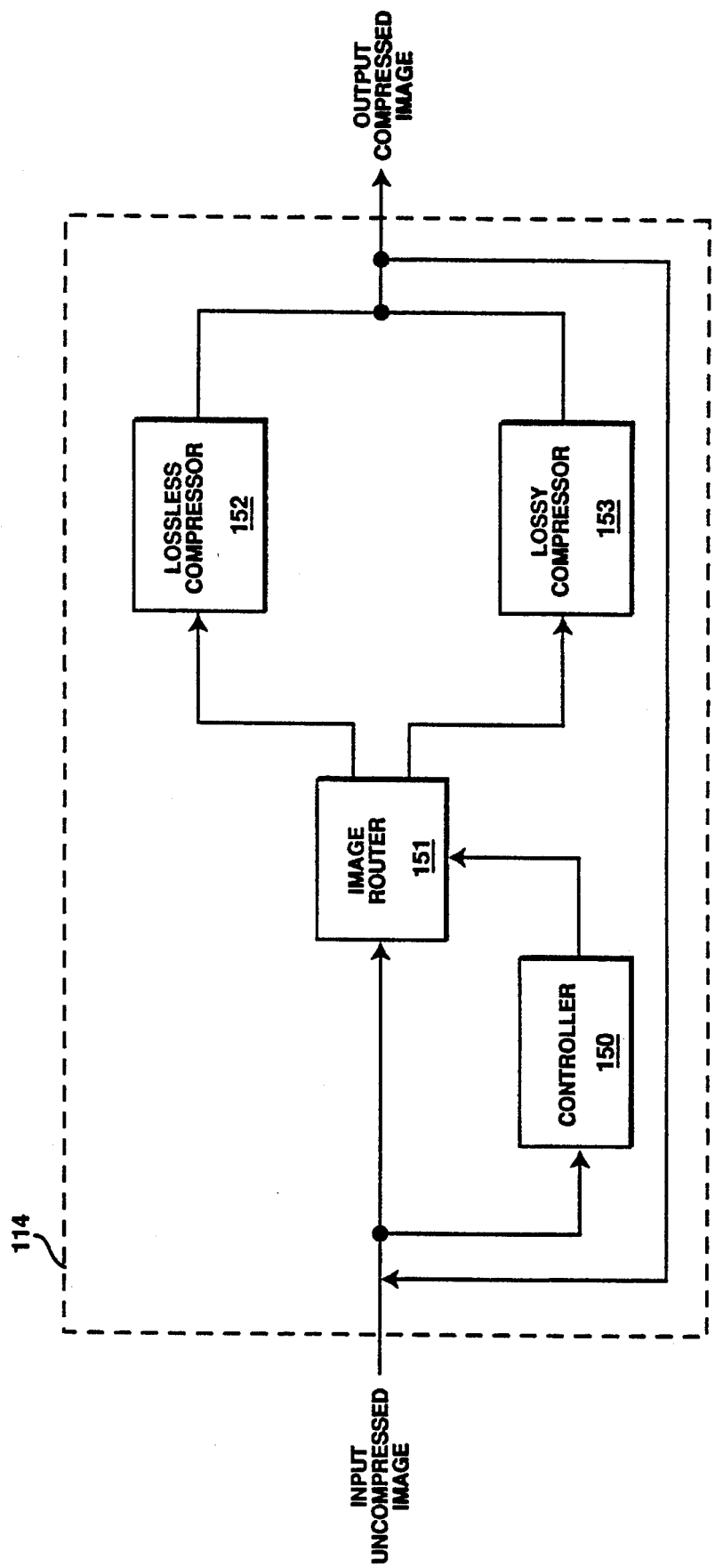
FIG. 1B shows the implementation of a compression manager in one embodiment of the present invention.

FIG. 1B shows an alternate implementation of compression manager 114. An uncompressed image is received by compression manager 114 and input to both controller 150 and image router 151. Controller 150 determines the proper compression technique to use in compressing the image, as discussed in more detail below with respect to FIG. 4, and outputs a signal to image router 151 indicating the proper compression technique. Image router 151 operates in a conventional manner to direct the uncompressed image to either lossless compressor 152 or lossy compressor 153, based on the signal received from controller 150. It should be noted that under certain circumstances, discussed in more detail below, controller 150 may signal image router 151 to route only a portion of the image to lossless compressor 152 or lossy compressor 153. Lossless compressor 152 compresses images using a conventional lossless algorithm. Lossy compressor 153 compresses images using a conventional lossy algorithm. Thus, compression manager 114 outputs a compressed image, with the compression technique being determined by controller 150. It should also be noted that under certain circumstances, discussed in more detail below, a particular uncompressed image may be compressed twice, using both compression techniques, however the result of only one of these compressors is output by compression manager 114 as the compressed image.

Returning to FIG. 1A, the display device 107 utilized with the computer system of the present invention may be a liquid crystal device, cathode ray tube, or other display device suitable for creating graphic images and alphanumeric characters (and ideographic character sets) recognizable to the user. The cursor control device 109 allows the computer user to dynamically signal the two dimensional movement of a visible symbol (pointer) on a display screen of the display device 107. Many implementations of the cursor control device are known in the art including a trackball, mouse, joystick or special keys on the alphanumeric input device 108 capable of signaling movement of a given direction or manner of displacement. It is to be appreciated that the cursor visible symbol (pointer) also may be directed and/or activated via input from the keyboard using special keys and key sequence commands. Alternatively, the cursor may be directed and/or activated via input from a number of specially adapted cursor directing devices, including those uniquely developed for the disabled.

In some implementations of the present invention additional processors or other components may be included. In addition, certain implementations of the present invention may not require nor include all of the above components. For example, hard copy device 111, display device 107, or data storage device 106 may not be coupled with bus 100.

Figure 2:
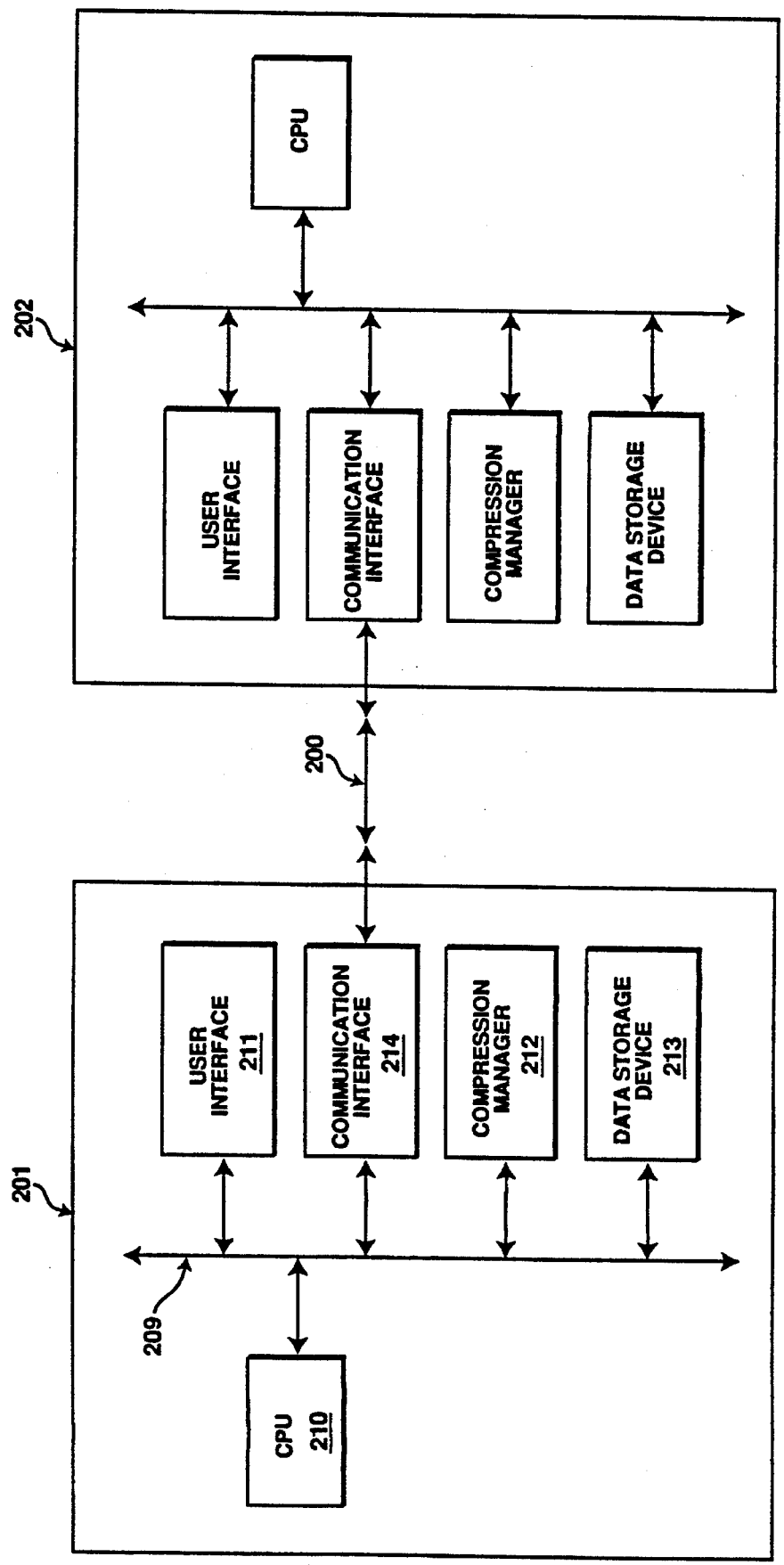
FIG. 2 shows an overview of an example personal conferencing system of the present invention.

FIG. 2 shows an overview of an example personal conferencing system of the present invention. Two agents are shown, agent 201 and agent 202, coupled together by a communication medium 200. Communication medium 200 may be any of a wide variety of communication media. For example, communication medium 200 may be a telephone line or a LAN connection.

Agent 201 includes a central processing unit (CPU) 210, a user interface 211, a compression manager 212, a data storage device 213, and a communication interface 214. Agent 201 also includes an internal bus 209 for communicating instructions and data between these components. In one implementation of the present invention, agent 201 is the computer system shown in FIG. 1A, with compression manager 212 of FIG. 2 being compression manager 114 of FIG. 1A and CPU 210 of FIG. 2 being processor 101 of FIG. 1A. Alternatively, agent 201 may be a processor-based facsimile machine.

CPU 210 retrieves and executes instructions from data storage device 213. Data storage device 213 includes both instructions and data for use by CPU 210, analogous to processor 101 of FIG. 1A. In one embodiment of the present invention data storage device 213 is data storage device 106 of FIG. 1A. Alternatively, data storage device 213 could be RAM 104 or ROM 105 of FIG. 1A.

Returning to FIG. 2, user interface 211 controls the transfer of information and requests between agent 201 and the user of agent 201. User interface 211 may include, for example, display device 107, alphanumeric input device 108, and cursor control device 109 of FIG. 1A. Requests for data or other instructions by the system user are input to agent 201 via user interface 211. In addition, data requested by the user is displayed or otherwise provided to the user via user interface 211. In one embodiment of the present invention, user interface 211 operates according to an operating system being executed by CPU 210 which controls the functioning of the entire agent 201. In an alternate embodiment, user interface 211 operates according to a separate software program being executed by CPU 210.

Figure 4:
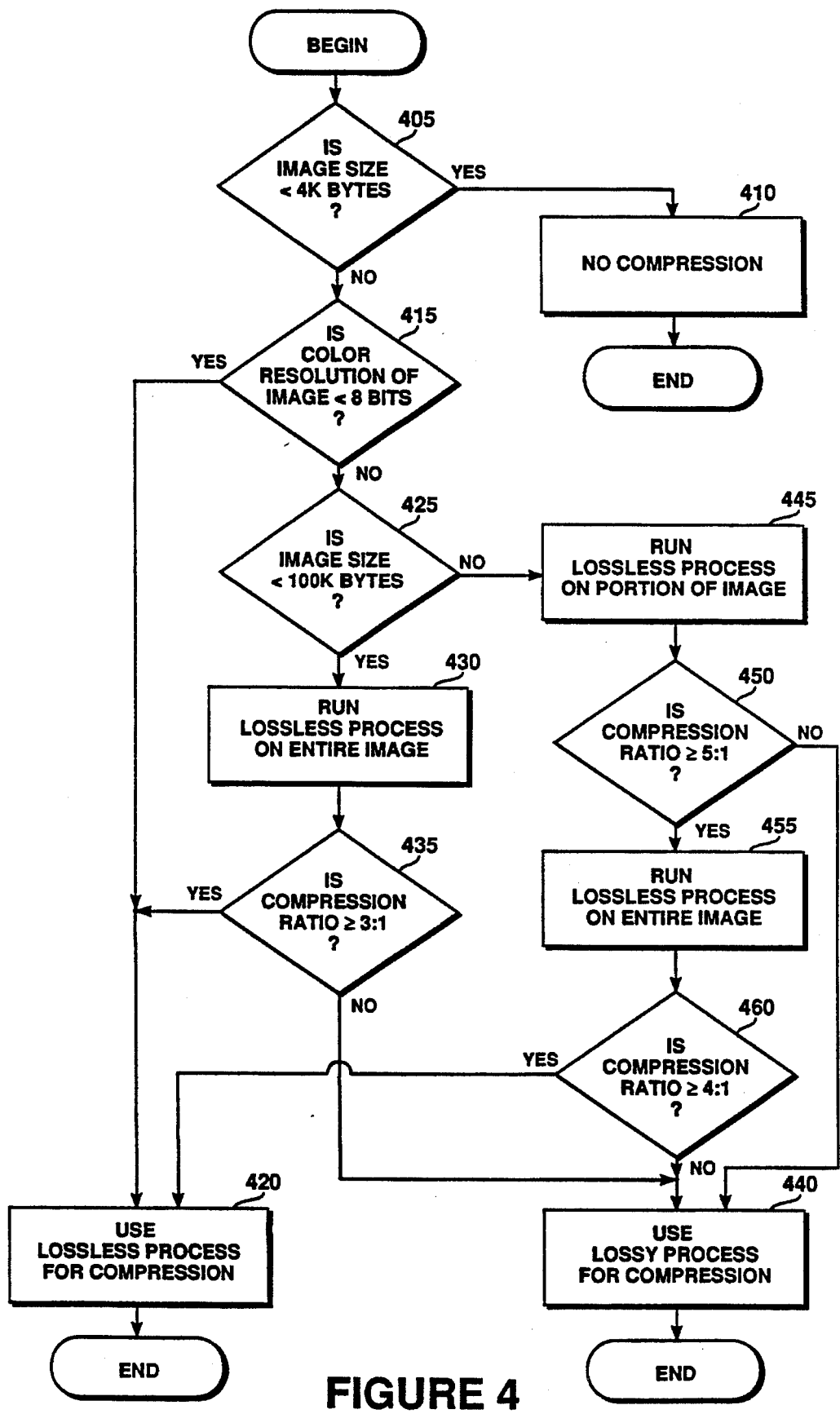
FIG. 4 is a flowchart showing the steps followed in selecting the image compression process in one embodiment of the present invention.

Compression manager 212 performs the steps of selecting an image compression process for the present invention. In one embodiment, these steps are as shown in FIG. 4 below. Compression manager 212 selects the compression process for both transfer of data to agent 201 via communication interface 214 and communication medium 200, and also for storage in data storage device 213. In one embodiment of the present invention, the data or image to be compressed is indicated by the system user via interface 211. Both this request by the user and the data to be compressed are indicated to compression manager 212 via CPU 210.

In one embodiment of the present invention, compression manager 212 compresses the data received by CPU 210. Compression manager 212 then stores the data, in compressed format, in data storage device 213. In addition, compression manager 212 may also transfer the data to agent 202 via communication medium 200, depending on the request received from user interface 211.

In an alternate embodiment, compression manager 212 stores the data received from CPU 210 in data storage device 213. It should be noted that this data stored in data storage device 213 is not in compressed format. Then, dependent on the request received from interface 211, compression manager 212 compresses the data received from CPU 210, and transfers the data to agent 202 via communication medium 200. Thus, in this embodiment, the data stored in data storage device 213 is not in compressed format; however, compression manager 212 compresses the data before transferring it to agent 202.

Communication interface 214 provides an interface between communication medium 200 and agent 201. Communication interface 214 includes the necessary components to transfer signals via the particular communication medium being used as communication medium 200. For example, communication interface 214 may be a LAN interface or a modem.

In one embodiment of the present invention, agent 201 includes header information along with the image being transferred to agent 202. This header information provides information related to the image(s) being transferred. In one implementation, this header information includes an indicator of the compression process used by agent 201 in compressing the image, thereby enabling agent 202 to utilize the proper decompression process when decompressing the image. Additional information may also be included in the header information, such as the color resolution of the image, the image size when compressed, and the image size when uncompressed.

In one embodiment of the present invention, agent 201 also receives images from agent 202. In this embodiment, agent 202 operates analogous to agent 201 described above. When receiving an image, agent 201 decompresses the image received. This decompression is performed in a conventional manner by agent 201, based on the technique used by agent 202 in compressing the image. In one implementation, CPU 210 performs the decompression. In an alternate implementation, compression manager 212 performs the decompression. The compression technique utilized by agent 202 to compress the image is included in the header information for the image, as discussed above.

In one embodiment of the present invention, agent 202 is identical to agent 201. Alternatively, agent 202 may include additional components not included in agent 201.

It will be understood by those skilled in the art that additional components may be added to or removed from agents 201 and 202 of FIG. 2. For example, additional components may be coupled to internal bus 209 of agent 201, such as those components shown coupled to bus 100 of FIG. 1A. Furthermore, certain components shown in FIG. 2 may not be included within the system. For example, agent 202 may not contain a data storage device. Thus, data transferred from agent 201 to agent 202 is output to the user of agent 202 via the user interface, however agent 202 does not store the received data.

Figure 3:
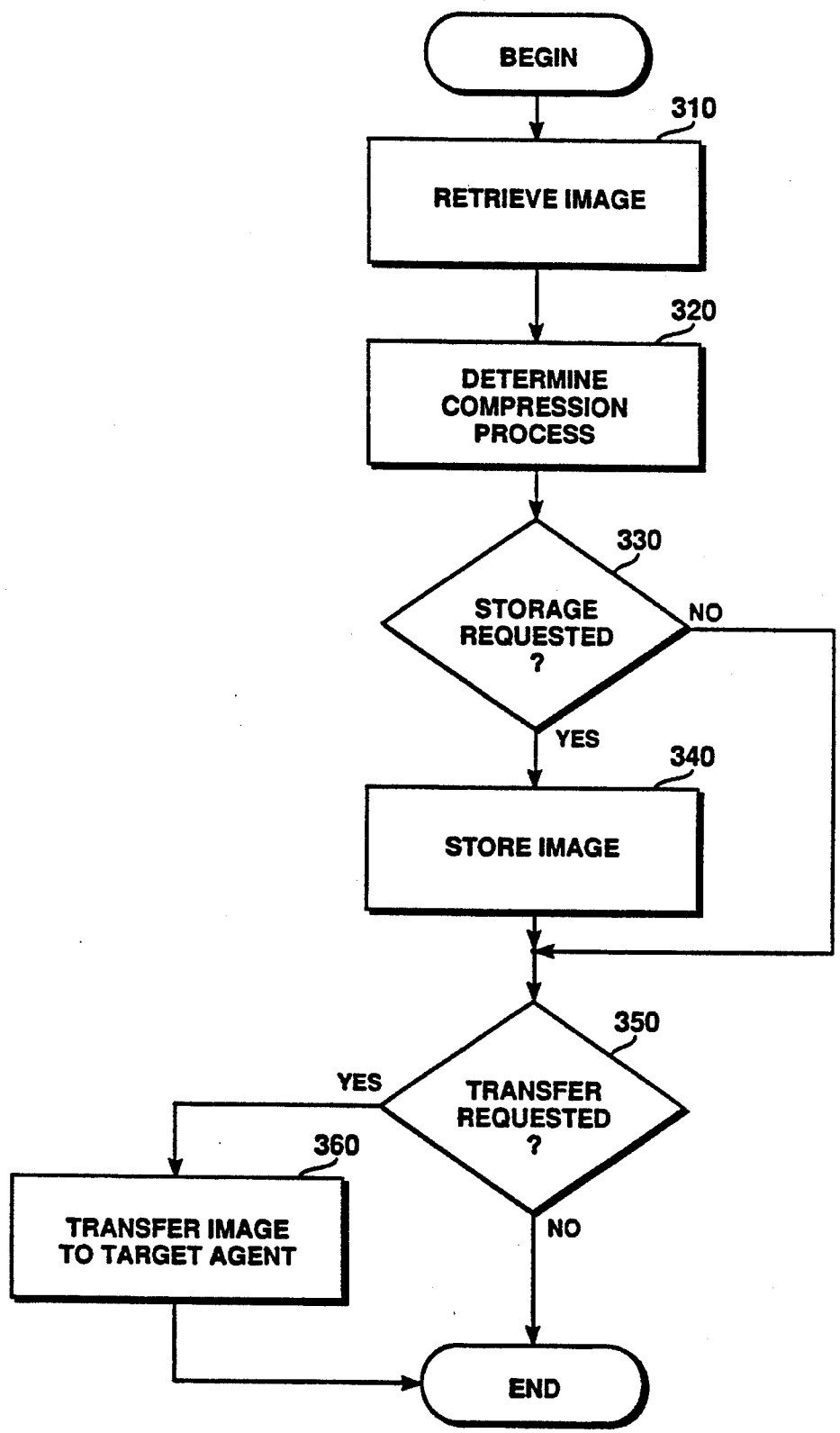
FIG. 3 is a flowchart showing the steps followed in one embodiment of the present invention in storing and transferring data.

FIG. 3 is a flowchart showing the steps followed in one embodiment of the present invention in storing and transferring data. The data representing the image is first retrieved, step 310. This image is retrieved via CPU 210, from either user interface 211 or data storage device 213, of FIG. 2. After retrieving the image, the present invention determines which compression process to use, step 320. This determination is discussed in more detail below with reference to FIG. 4. In one embodiment of the present invention, the image is compressed in step 320 according to the compression process determined in step 320. In an alternate embodiment, the compression process to be used is determined in step 320, but the compression is not actually performed in step 320.

After determining the compression process, a determination is made as to whether storage of the image is requested, step 330. A storage request is received via CPU 210 from user interface 211. If storage is requested, then the image is stored in data storage device 213, step 340. In one implementation, the image is stored in step 340 in compressed format. Alternatively, the image may be stored in step 340 in uncompressed format.

Regardless of whether storage was requested in step 330, a determination is next made as to whether a transfer is requested, step 350. A transfer request is received via CPU 210 from user interface 211. If a transfer is not requested, then the storage process is complete. However, if a transfer is requested, then the image is transferred to the target agent, step 360. The image is transferred after being compressed according to the compression process determined in step 320. This compression may have been performed in step 320, or, alternatively, it may be performed in step 360 prior to the transfer.

In one embodiment of the present invention, a two-dimensional view of an image is utilized to select the image compression process, as shown in Table 1 below. The two dimensions are: image size and color resolution. Two thresholds exist in the image size dimension, and a single threshold exists in the color resolution dimension.

TABLE 1

| | | First Threshold | Second Threshold |
|---|---|---|---|
| First Threshold | No Compression | Lossless Compression | Lossless Compression |
| | No Compression | Process depends on result of lossless process | Process depends on trial run of lossless process and possibly result of lossless process of entire image |

If the image size is smaller than the first threshold in the image size dimension, then no compression is utilized, regardless of the color resolution. However, if the image size is not less than the first threshold in the image size dimension, then the compression process is dependent on the first threshold in the color resolution dimension, and also possibly on the second threshold in the image size dimension.

If the color resolution is less than the first threshold in the color resolution dimension, then the lossless compression process is utilized. However, if the color resolution is not less than the first threshold in the color resolution dimension, then the compression process determination is dependent on the second threshold in the image size dimension. If the image size is less than the second threshold in the image size dimension, then the compression process is determined based on the compression ratio resulting from lossless compression of the image. However, if the image size is not less than the second threshold in the image size dimension, then the compression process is determined based on the compression ratio resulting from a trial run of lossless compression on a portion of the image, and possibly on the compression ratio resulting from lossless compression of the entire image.

FIG. 4 is a flowchart showing the steps followed in selecting the image compression process in one embodiment of the present invention. This is step 320 of FIG. 3. First, a determination is made as to whether the image size is less than a predetermined value (4k bytes as shown), step 405. The image size is generated by multiplying the screen resolution of the image by the color resolution of the image. The screen resolution of the image refers to the number of pixels which comprise the image on the display device. It should be noted that the screen resolution of the image may be smaller than the screen resolution of the display device. For example, the screen resolution of the display device may be 1024×768, however the screen resolution of the image is only 1024×384 (393,216 pixels) if the image encompasses only the left-hand side of the display device.

If the image size is less than 4k bytes, then the image is not compressed, step 410. That is, no compression is performed if the image is small enough in size. The selection of this predetermined threshold (4k bytes) is based on the time required to compress the image, transfer it over the communication line and then decompress it at the target agent versus the time required to transfer the image in uncompressed format. No compression is performed if the image is small enough to be transferred quicker in uncompressed format than the combined time required to compress the image, transfer it over the communication line and then decompress it at the target agent.

A determination is then made of whether the color resolution of the image is less than a predetermined value (eight bits as shown), step 415. This determination is made because a low color resolution indicates that the image is not a continuous tone image. For example, if the screen resolution is 100×100 pixels, and the color resolution is 4 bits, then there are a total of 10,000 pixels within the image each of which can be one of 16 different colors. Therefore, the entropy of the image is relatively high.

If the color resolution is less than eight bits, then a lossless process is used for compression, step 420. A lossless process is used because, as discussed above, the entropy of the image will be relatively high. In one embodiment of the present invention, the image is compressed using the lossless process in step 420. In an alternate embodiment, in step 420 the lossless compression process is indicated as the compression process to use, but the actual compression is performed at a later time (such as step 360 in FIG. 3, as discussed above).

However, if the color resolution is greater than or equal to eight bits in step 415, then a determination is made of whether the image size is less than 100k bytes, step 425. If the image size is less than 100k bytes, then the lossless compression process is performed on the entire image, step 430. A determination is then made as to whether the compression ratio that resulted from running the lossless process is greater than or equal to 3:1, step 435. The compression ratio is obtained by taking the ratio of the image size before compression to the image size after compression. If the compression ratio is greater than or equal to 3:1, then the lossless process is used for compression, step 420. It should be noted that the entire image was compressed using the lossless process in step 430, thus, the compression process need not be repeated in step 420.

The lossless compression process is run on the entire image in step 430 because the lossless compression process itself is relatively quick. Thus, when the image is small enough in size, the entire image can be compressed using the lossless process in a relatively short period of time. Returning to step 435, if the compression ratio is not greater than or equal to 3:1, then a lossy process is used for compression, step 440, which should usually result in a higher compression ratio.

In step 435, if the compression ratio is not greater than or equal to 3:1 then the present invention presumes that a lossy compression process will work better. In an alternate embodiment, an additional verification step is performed after step 435 where the image is compressed using a lossy process. The compression ratio which results from the lossy process is then compared to the compression ratio determined in step 430, and the process with the higher compression ratio is used as the compression process.

Analogous to the discussion above with respect to step 420, in one embodiment of the present invention the image is compressed using the lossy process in step 440. In an alternate embodiment, in step 440 the lossy process is indicated as the compression process to use, but the actual compression is performed at a later time, It should be noted that under certain circumstances the original uncompressed image is compressed using the lossless process (step 430), but the lossy process is indicated as the compression process to use for the image (step 440). Thus, the image is compressed using the lossless process, then the resulting compressed image is discarded and the uncompressed image is compressed again using the lossy process. However, this situation occurs when the image is relatively small in size, thereby resulting in a relatively minimal system performance loss.

Returning to step 425, if the image is greater than or equal to 100k bytes, then the lossless process is run on a predetermined portion of the image, step 445. In one embodiment of the present invention, the size of this predetermined portion is 10k bytes. It should be noted that this predetermined portion could be any portion of the entire image. For example, the predetermined portion could be the first 10k bytes in the image, the last 10k bytes in the image or the 10k bytes in the middle of the image. In one implementation of the present invention, the lossless process is performed on the 10k bytes that are in the middle of the image.

After running the lossless process in step 445, a determination is made as to whether the compression ratio for the predetermined portion using the lossless process is greater than or equal to 5:1, step 450. If the compression ratio on this predetermined portion is not greater than or equal to 5:1, then a lossy process is used for compression, step 440. However, if the compression ratio is greater than or equal to 5:1, then the lossless process is run for the entire image, step 455.

A determination is then made as to whether the compression ratio resulting from the lossless process in step 455 is greater than or equal to 4:1, step 460. If this compression ratio is not greater than or equal to 4:1, then a lossy process is used for data compression, step 440. However, if the compression ratio is greater than or equal to 4:1, then the lossless process is used for data compression, step 420.

Step 460 is performed as an additional comparison to prevent against the predetermined portion compressed in step 445 not being representative of the entire image. Thus, if a 5:1 compression ratio is obtained in step 450, then the lossless process is run on the entire image and the compression ratio is compared again in step 460. If the compression ratio is still greater than or equal to a predetermined ratio (4:1 as shown), then the predetermined portion is representative of the entire image and the lossless compression process is used for data compression. If the compression ratio is less than the predetermined ratio, then the predetermined portion was not representative of the entire image, and the lossy compression process is used.

It should be noted that under certain circumstances the original uncompressed image is compressed using the lossless process (step 455) and the lossy process is indicated as the compression process to use for the image (step 440). Thus, the image is compressed using the lossless process, then the resulting compressed image is discarded and the uncompressed image is compressed again using the lossy process. However, this situation occurs when the image is relatively large in size. Therefore, additional time spent in determining the proper compression process to use is more than offset by a better reduction in image size and corresponding reduction in transfer time across the communication medium.

In one embodiment of the present invention, steps 455 and 460 are not performed. In this embodiment, if the compression ratio in step 450 is greater than or equal to 5:1, then the lossless compression algorithm is used, step 420. Thus, time is saved in the compression process determination by not checking whether the predetermined portion of the image used in step 445 is representative of the entire image.

Thus, it can be seen that for relatively large images, the lossless process is run on a portion of the image before trying to compress the entire image. Thus, a preliminary determination can be made as to which process is most likely the best for this particular image. If the lossless compression process performs well, then that is the compression process that will be used by the present invention. However, if the lossless process does not work well in this preliminary determination, then the lossy process is used for data compression.

In one embodiment of the present invention, the well-known LZW data compression algorithm is used as the lossless data compression process and the well-known JPEG data compression algorithm is used as the lossy data compression process. However, it will be appreciated that any of a wide variety of data compression algorithms can be used in the present invention.

Figure 5:
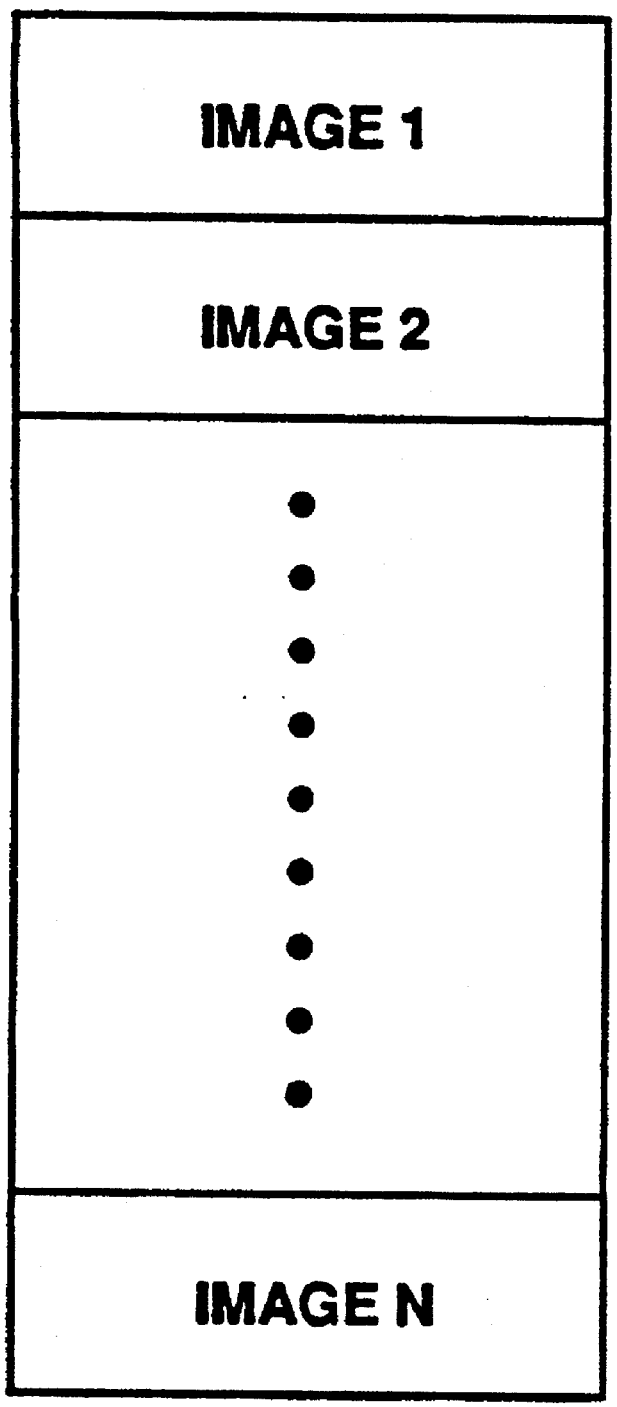
FIG. 5 is a block diagram of a data storage device in one embodiment of the present invention.

FIG. 5 is a block diagram of a data storage device in either FIG. 1A or FIG. 2 in one embodiment of the present invention. As shown in FIG. 5, the data storage device contains N images. All of the images contained within the storage device can be of the same size or different sizes, dependent on the screen resolution and color resolution for each of the images. It should be noted that an image as shown in FIG. 5 and discussed in FIGS. 1–4 could be an image of text, an image of a picture or photograph, or a combination thereof. In one embodiment of the present invention, each image represents one entire screen of the visual display. In an alternate embodiment, each image represents multiple screens that can be displayed on a visual device.

Thus, it can be seen that the present invention automatically determines the optimal compression process to be used for each particular image. This determination is made relatively quickly and may include not compressing the image, depending on the size of the image. The present invention takes advantage of the observation that in situations where the lossy process for data compression works well, the lossless process does not work well, and vice versa. It will be understood by those skilled in the art that the present invention determines the compression process to be used in a relatively quick manner, without running multiple compression processes on the entire image and comparing the results.

It will be appreciated that the specific values, such as compression ratios and image sizes, discussed above are exemplary only. For example, in the discussions of a compression ratio of 4:1, a compression ratio of 4.1:1 or 3.5:1 could be used instead. Such modifications of the exemplary values will be understood by those skilled in the art, and am within the scope and spirit of the present invention.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for dynamically selecting an image compression process has been described.

What is claimed is:

1. A method for selecting an image compression process to compress an image, said method comprising the steps of:
   (a) determining an uncompressed size of said image;
   (b) determining a color resolution of said image; and
   (c) selecting said image compression process based on the uncompressed size of said image and the color resolution of said image.

2. The method of claim 1, wherein said selected image compression process is a lossless data compression process which compresses said image while retaining all data for said image.

3. The method of claim 1, wherein said selected image compression process is a lossy data compression process which compresses said image by losing a small amount of data for said image.

4. The method of claim 1, wherein said step (c) comprises selecting a first data compression process which retains all data for said image, provided the color resolution of said image is below a predetermined value.

5. The method of claim 1, wherein said step (c) comprises the steps of:
   compressing said image utilizing a first data compression process which retains all data for said image; and
   determining a compression ratio for said image from said first data compression process.

6. The method of claim 5, wherein said step (c) further comprises the step of utilizing said first data compression process as said image compression process, provided said compression ratio is greater than a predetermined value, otherwise utilizing a second data compression process which loses a small amount of data for said image as said image compression process.

7. The method of claim 1, wherein said selecting step (c) further comprises selecting said image compression process based on a compression ratio corresponding to said image.

8. A method for selecting an image compression process to compress an image, said image having a size and a color resolution, said method comprising the steps of:
   (a) determining the size of said image;
   (b) determining the color resolution of said image; and
   (c) selecting said image compression process based on the size of said image and the color resolution of said image, wherein said image compression process leaves said image uncompressed, provided the size of said image is less than a predetermined size.

9. A method for selecting an image compression process to compress an image, said image having a size and a color resolution, said method comprising the steps of:
   (a) determining the size of said image;
   (b) determining the color resolution of said image;
   (c) compressing a predetermined portion of said image utilizing a first data compression process which reduces the size of said image while retaining all data for said image;
   (d) determining a first compression ratio for said predetermined portion of said image from said first data compression process; and
   (e) selecting said image compression process based on the first compression ratio.

10. The method of claim 9, wherein said step (c) further comprises the step of selecting a second data compression process as said image compression process which reduces the size of said image by losing a small amount of data for said image, provided said first compression ratio is greater than a first predetermined value, otherwise,
    compressing said image utilizing said first data compression process,
    determining a second compression ratio for said image from said first data compression process, and
    selecting said first data compression process as said image compression process, provided said second compression ratio is greater than a second predetermined value, otherwise selecting said second data compression process as said image compression process.

11. An apparatus for selecting an image compression process to compress an image, wherein said apparatus is coupled to a user interface for displaying said image, said apparatus comprising:
    a compression manager for
    determining an uncompressed size of said image,
    determining a color resolution of said image, and
    selecting said image compression process based on the uncompressed size of said image and the color resolution of said image.

12. The apparatus of claim 11, wherein said compression manager selects an image compression process which retains all data for said image, provided the color resolution of said image is below a predetermined value.

13. The apparatus of claim 11, wherein said compression manager is also for:
    compressing said image utilizing a first data compression process;
    determining a compression ratio for said image from said first data compression process; and
    utilizing said first data compression process as said image compression process, provided said compression ratio is greater than a predetermined value, otherwise utilizing a second data compression process which loses a small amount of data for said image as said image compression process.

14. The apparatus of claim 11, wherein said compression manager is also for:
    compressing a predetermined portion of said image utilizing a first data compression process;
    determining a first compression ratio for said predetermined portion of said image from said first data compression process; and
    selecting a second data compression process as said image compression process, provided said first compression ratio is greater than a first predetermined value, otherwise,
    compressing said image utilizing said first data compression process,
    determining a second compression ratio for said image from said first data compression process, and
    selecting said first data compression process as said image compression process, provided said second compression ratio is greater than a second predetermined value, otherwise selecting said second data compression process as said image compression process.

15. An apparatus for selecting an image compression process to compress an image, said image having a size and a color resolution, wherein said apparatus is coupled to a user interface for displaying said image, said apparatus comprising:
    a compression manager for determining the size of said image, determining the color resolution of said image, and selecting said image compression process based on the size of said image and the color resolution of said image, wherein said image_ compression process leaves said image uncompressed, provided the size of said image is less than a predetermined size.

16. A computer system comprising:

a central processing unit (CPU);

a mass storage device;

a bus coupled to said CPU and said mass storage device; and a compression manager for selecting an image compression process to compress an image, said image having an uncompressed size and a color resolution, said selecting being based on the uncompressed size and the color resolution of said image.

17. The system of claim 16, wherein said compression manager selects an image compression process which retains all data for said image, provided the color resolution of said image is below a predetermined value.

18. The system of claim 16, wherein said compression manager is also for:

compressing said image utilizing a first data compression process;

determining a compression ratio for said image from said first data compression process; and utilizing said first data compression process as said image compression process, provided said compression ratio is greater than a predetermined value, otherwise utilizing a second data compression process which loses a small amount of data for said image as said image compression process.

19. The system of claim 16, wherein said compression manager is also for:

compressing a predetermined portion of said image utilizing a first data compression process;

determining a first compression ratio for said predetermined portion of said image from said first data compression process; and selecting a second data compression process as said image compression process, provided said compression ratio is greater than a first predetermined value, otherwise, compressing said image utilizing said first data compression process, determining a second compression ratio for said image from said first data compression process, and selecting said first data compression process as said image compression process, provided said second compression ratio is greater than a second predetermined value, otherwise selecting said second data compression process as said image compression process.

20. A computer system comprising:

a central processing unit (CPU);

a mass storage device;

a bus coupled to said CPU and said mass storage device;

an interconnecting device coupled to said bus to transfer data from said computer system to an agent; and a compression manager for selecting an image compression process to compress an image, said image having a size and a color resolution, said selecting being based on the size and the color resolution of said image, wherein said image compression process leaves said image uncompressed, provided the size of said image is less than a predetermined size.

21. A computer-readable medium having stored thereon a program of instructions executable by a processor, the program of instructions including sequences of instructions which, when executed by the processor, cause said processor to perform the steps of:

(a) determining an uncompressed size of an image;

(b) determining a color resolution of said image; and (c) selecting an image compression process for compressing said image, wherein said selecting is based on the uncompressed size of said image and the color resolution of said image.

22. The computer-readable medium of claim 21, wherein said selecting step (c) comprises selecting an image compression process which leaves said image uncompressed, provided the uncompressed size of said image is less than a predetermined size.

23. The computer-readable medium of claim 21, wherein said selecting step (c) comprises the steps of:

compressing said image using a lossless data compression process; and determining a compression ratio for said image from said lossless data compression process.

24. The computer-readable medium of claim 21, wherein said selecting step (c) comprises the steps of:

compressing a predetermined portion of said image using a lossless data compression process; and determining a compression ratio for said predetermined portion of said image from said lossless data compression process.

25. The computer-readable medium of claim 21, wherein said selecting step (c) further comprises selecting said image compression process based on a compression ratio corresponding to said image.

* * * * *

UNITED STATES PATENT AND TRADEMARK OFFICE
CERTIFICATE OF CORRECTION

PATENT NO. : 5,553,160

DATED : September 3, 1996

INVENTOR(S) : Bryan J. Dawson

It is certified that error appears in the above-identified patent and that said Letters Patent is hereby corrected as shown below:

In column 1 at line 65 delete "Modem" and insert --Modern--

In column 3 at line 10 delete "Alteratively," and insert --Alternatively,--

In column 12 at line 57 delete "am" and insert --are--

In column 15 at line 5 delete "image_" and insert --image--

Signed and Sealed this

Eighth Day of April, 1997

Attest:

BRUCE LEHMAN

Attesting Officer

Commissioner of Patents and Trademarks